United States Patent
Jasleen et al.

(10) Patent No.: US 11,966,490 B2
(45) Date of Patent: Apr. 23, 2024

(54) AUTOMATED SECURITY PROFILE MANAGEMENT FOR AN INFORMATION HANDLING SYSTEM

(71) Applicant: Dell Products L.P., Round Rock, TX (US)

(72) Inventors: Fnu Jasleen, Austin, TX (US); Joseph Paul Marquardt, Menlo Park, CA (US); Rocco Ancona, San Jose, CA (US)

(73) Assignee: Dell Products L.P., Round Rock, TX (US)

(*) Notice: Subject to any disclaimer, the term of this patent is extended or adjusted under 35 U.S.C. 154(b) by 732 days.

(21) Appl. No.: 17/109,823

(22) Filed: Dec. 2, 2020

(65) Prior Publication Data

US 2022/0171875 A1   Jun. 2, 2022

(51) Int. Cl.
G06F 21/00   (2013.01)
G06F 21/62   (2013.01)
G06N 20/00   (2019.01)

(52) U.S. Cl.
CPC ......... G06F 21/6245 (2013.01); G06N 20/00 (2019.01)

(58) Field of Classification Search
CPC ...... G06F 21/6245; G06F 21/84; G06F 21/88; G06N 20/00; G06N 3/045; G06N 3/08
See application file for complete search history.

(56) References Cited

U.S. PATENT DOCUMENTS

| | | | | |
|---|---|---|---|---|
| 8,688,734 | B1* | 4/2014 | Tidd | G06F 16/176 707/783 |
| 11,379,608 | B2* | 7/2022 | Swafford | H04L 63/1408 |
| 2010/0332422 | A1* | 12/2010 | Cheng | G06N 20/00 706/12 |
| 2012/0047554 | A1* | 2/2012 | Mihara | H04L 63/205 726/1 |
| 2014/0201844 | A1* | 7/2014 | Buck | G06F 21/554 726/26 |
| 2014/0283138 | A1* | 9/2014 | Hochberg | H04L 63/08 726/30 |
| 2016/0034589 | A1* | 2/2016 | Liu | G06F 16/9535 707/706 |
| 2016/0124485 | A1* | 5/2016 | Felde | G06F 1/329 713/320 |
| 2016/0180093 | A1* | 6/2016 | Goss | G06F 21/6218 726/1 |
| 2019/0065790 | A1* | 2/2019 | Jones | G06F 21/6218 |
| 2019/0289038 | A1* | 9/2019 | Li | H04L 9/3215 |
| 2021/0232673 | A1* | 7/2021 | Athlur | G06F 21/82 |
| 2022/0050897 | A1* | 2/2022 | Gaddam | G06N 3/006 |
| 2022/0092194 | A1* | 3/2022 | Debaecker | G06F 16/907 |

\* cited by examiner

*Primary Examiner* — John B King
(74) *Attorney, Agent, or Firm* — Norton Rose Fulbright US LLP

(57) ABSTRACT

An information handling system may receive, from a first sensor of the information handling system, first sensor data. The information handling system may receive, from a second sensor of the information handling system, second sensor data. Based, at least in part, on the first sensor data and the second sensor data, the information handling system may generate a plurality of security profiles for the information handling system. Based, at least in part, on the first sensor data and the second sensor data, the information handling system may apply a security profile of the plurality of security profiles to the information handling system.

17 Claims, 4 Drawing Sheets

AUTOMATED SECURITY PROFILE MANAGEMENT FOR AN INFORMATION HANDLING SYSTEM

FIELD OF THE DISCLOSURE

The present disclosure generally relates to information handling systems, and more particularly relates to information handling system security.

BACKGROUND

As the value and use of information increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

As use of information handling systems approaches ubiquity privacy is of increasing concern. For example, users may access and manipulate information using information handling systems in a variety of settings, ranging from private to public. Some information may be sensitive, intended for exposure to only authorized users. Protecting information from being viewed or otherwise accessed by unauthorized users is of particular importance. For example, it may be desirable to prevent unauthorized individuals from viewing information displayed on an information handling system display when an authorized user is not present, over the shoulder of an authorized user, or in other scenarios. It may also be desirable to prevent unauthorized individuals from copying information from the information handling system via external information handling systems, or recording a conversation between an authorized user of an information handling system and a third party. Reliance on a user to maintain privacy of information presented or stored by an information handling system can result in unintentional data privacy breaches, such as when a user is unaware that a threat to privacy of the information exists. For example, a user may be unaware of an individual approaching from behind and may expose sensitive information displayed on a display of the information handling system to the individual. Alternatively, a user may be unaware of cameras or microphones in the vicinity of the information handling system and may expose sensitive information to the cameras and/or microphones.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

Sensor data from multiple sensors of an information handling system, such as sensed environmental data, may be used as a basis for automatic application of a security profile to the information handling system. For example, if a camera of an information handling system detects an unauthorized individual within the camera's field of vision and an antenna of an information handling system detects one or more listening devices within a predetermined proximity of the information handling system, the information handling system may automatically activate a security profile that displays a privacy screen and mutes speakers of the information handling system to prevent private information from being exposed. In some embodiments a user may be notified of sensor data and a user response to the notification may be recorded. The sensor data and the user response may be provided to a machine learning algorithm as training data, and the machine learning algorithm may automatically generate one or more potential privacy modes for use by the information handling system. Furthermore, in addition to updating the machine learning algorithm using sensed data and user input data, sensed data without user input may also be used to update the machine learning algorithm to enhance functionality of the privacy modes and a user experience. Thus, sensor data from multiple sensors may be collected and analyzed as a basis for selection and automatic application of a security profile that is appropriate for the environment in which the information handling system is operated. The information handling system may also be configured to create profiles for authorized individuals, to avoid implementation of onerous security profiles based on a presence of authorized or trusted individuals. Such automatic operation can enable an information handling system to accurately predict security threats and prevent exposure of sensitive information to unauthorized individuals while enhancing a user experience.

A method for managing information handling system security may include receiving first sensor data from a first sensor and receiving second sensor data from a second sensor of the information handling system. For example, radio frequency data may be received from one or more antennas, video or image data may be received from one or more cameras, audio data may be received from one or more microphones, temperature data may be received from one or more temperature sensors, proximity data may be received from one or more proximity sensors, and infrared data may be received from one or more infrared sensors.

The information handling system may then generate a plurality of security profiles for the information handling system based on the received first sensor data and the received second sensor data. For example, the information handling system may train an unsupervised machine learning model using the received first sensor data and the received second sensor data to generate the plurality of security profiles. In some embodiments, generation of the plurality of security profiles may include determining a number of security profiles for generation based on the received first sensor data and the received second sensor data.

Based on the received first sensor data and second sensor data, the information handling system may automatically apply a security profile of the generated plurality of security profiles to the information handling system. Application of a security profile may include one or more of activating a privacy screen, minimizing one or more windows displayed on a display of the information handling system, muting one or more speakers of the information handling system, notifying a user of the information handling system, or blocking connection between the information handling system and an external information handling system associated with the first sensor data. For example, an information handling system may determine that an unauthorized individual is in close proximity with the information handling system and that one or more video recording devices are in close proximity with the information handling system. In response, the information handling system may automatically hide one or more windows displaying sensitive information on a display of the information handling system.

The first sensor of the information handling system may, for example, comprise an antenna, while the second sensor of the information handling system may comprise a camera. Application of a security profile to the information handling system may include activating a privacy screen of the information handling system based on detection of an unknown individual based on the first and second sensor data.

In some embodiments, the information handling system may identify an individual, other than a user of the information handling system, using the first sensor data. For example, the first sensor data may be image data of a face of the individual or voice data of the individual, and the information handling system may compare the data with a list of known individuals having associated image data and/or voice data. As another example, the first sensor data may be an identifier of an external information handling system associated with the individual, such as a media access control (MAC) address of a laptop or smart phone associated with the individual. Application of the security profile may be based, at least in part, on the identification of the individual. If the individual is a trusted contact on a white list of the information handling system, the information handling system may apply a lax security profile or may refrain from applying a security profile altogether. For example, an information handling system may detect a face of an individual using a camera of the information handling system. The information handling system may then cross reference the detected face with a white list including individuals and data associated with the individuals to determine if an individual with a matching face is included in the white list. If the individual is included in the white list, the information handling system may determine that the individual is a trusted contact and may apply a security profile or refrain from applying a security profile based on the inclusion of the individual on the white list. If the individual is not on the white list, the information handling system may apply a more strenuous security profile, such as a security profile that deactivates a display of the information handling system or prevents a user from displaying sensitive information on the display of the information handling system.

In some embodiments the information handling system may maintain a whitelist of trusted contact individuals. Profiles of trusted contact individuals may be included in the whitelist. Such profiles may, for example, include images of a face of the individual, identifiers of external information handling systems associated with the individual, such as media access control (MAC) addresses or identifiers of cell phones, laptops, and other information handling systems, and other information associated with the individual. For example, first sensor data received by the information handling system from the first sensor may include data identifying a first external information handling system, such as a laptop, associated with an individual, such as an information handling system identifier for an external information handling system associated with the individual that is present in a profile of the individual on a white list maintained by the information handling system.

In some embodiments the information handling system may update the whitelist using sensor data. For example, as discussed above an information handling system may receive first and second sensor data from first and second sensors. The information handling system may determine that an identified individual, such as an individual identified based on the first sensor data, is on a white list of the information handling system. The information handling system may then determine that the second sensor data comprises data identifying a second external information handling system. The second external information handling system may, however, be unassociated with the white list profile of the individual. The information handling system may then determine that the second external information handling system is associated with the identified individual. For example, the information handling system may monitor a location of the individual, such as by monitoring a location of the first external information handling system that the information handling system knows is associated with the identified individual, and the second external information handling system. If the second external information handling system maintains close proximity to the individual and/or the first external information handling system, such as by moving when the individual and/or first external information handling system move, the information handling system may determine that the second information handling system is associated with the identified individual. The information handling system may then add data identifying the second external information handling system to the white list profile of the identified individual. Then, in the future, when the second information handling system detects an individual and the second external information handling system, it may determine an identity of the individual based on detection of the second external information handling system.

An information handling system may include a memory, a first sensor, a second sensor, and a processor for performing the steps described herein. Alternatively or additionally, a computer program product may include a non-transitory computer-readable medium comprising instructions to cause a controller to perform the steps described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

Figure 1:
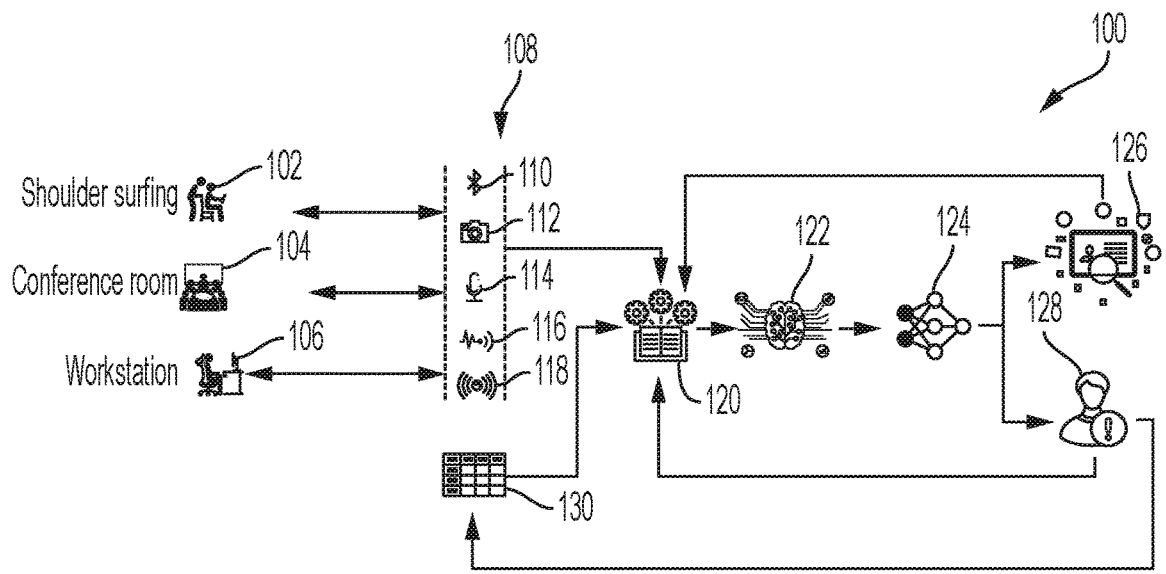
FIG. 1 is a diagram of an example information handling system including a system for automated security profile application, according to some embodiments of the disclosure.
Figure 2:
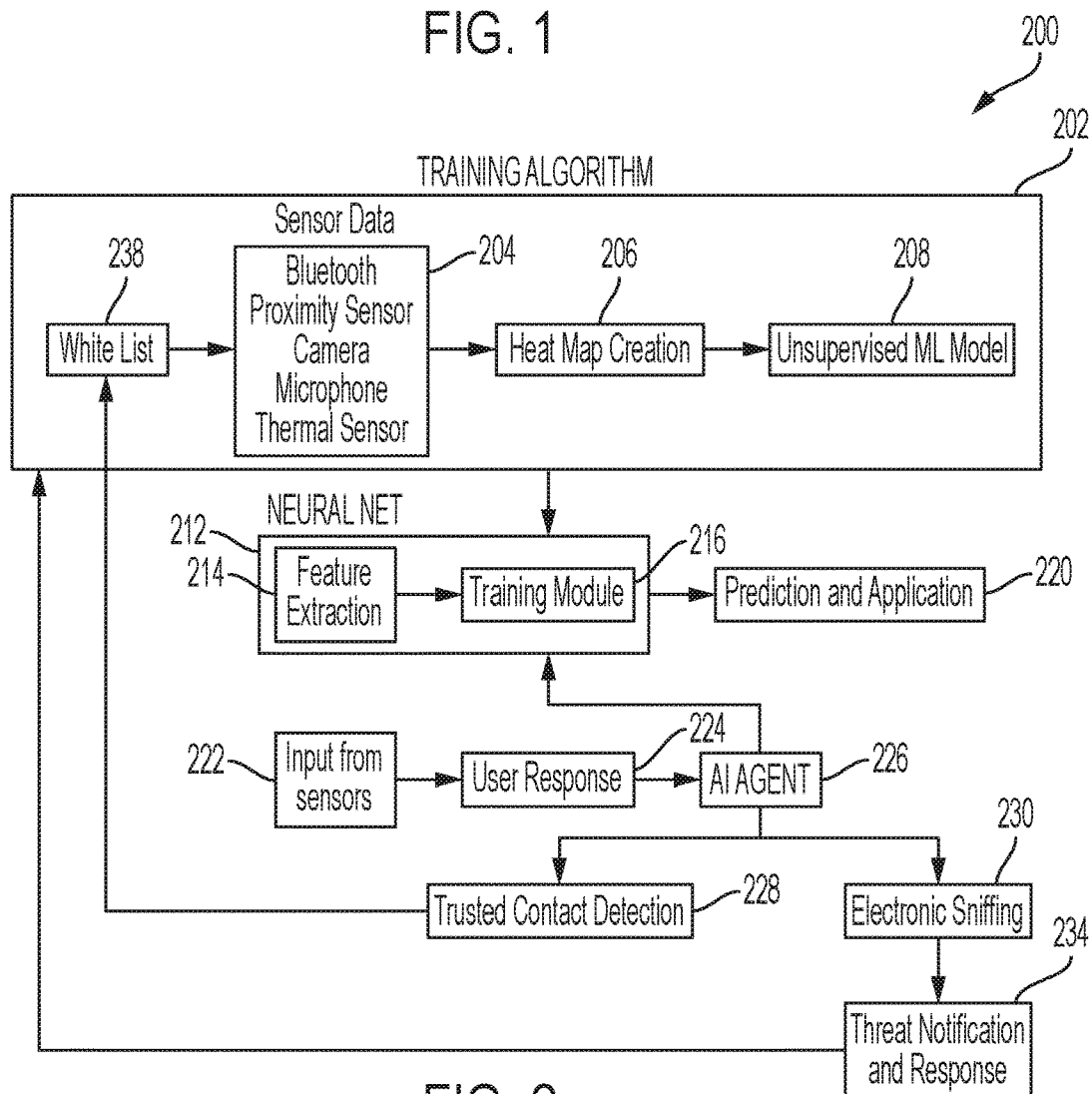
FIG. 2 is a block diagram of data processing of an example system for automated information handling system security profile management according to some embodiments of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application. The teachings can also be used in other applications and with several different types of architectures.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

A security profile management system executed by an information handling system may aggregate environmental data received from multiple sensors, may determine an appropriate security profile for application to the information handling system based on the environmental data, and may apply the security profile to the information handling system automatically. For example, if an information handling system determines that a user is in a public space, such as a coffee shop, based on location data, audio data, and visual data, it may automatically apply a security profile that includes activation of a privacy screen to prevent exposure of information displayed on a display of the information handling system to unauthorized individuals. In some cases, the information handling system may determine that one or more individuals, other than a user of the information handling system, are in close proximity to the information handling system and may determine whether the individual(s) are present on a white list of the information handling system. If the individuals are on the white list of the information handling system, the information handling system may apply a more lenient security profile, or may refrain from implementing a security profile altogether, while if the information handling system does not recognize the individuals, or recognizes the individuals and determines that they are not on the white list of the information handling system, the information handling system may apply a more strenuous security profile.

Information handling systems may be used in a variety of different environments. Sensors of an information handling system may collect data about an environment in which an information handling system is being used, and a security profile management system executed by a processor of an information handling system 100 may automatically apply a security profile based on the sensed environment of the information handling system, as shown in FIG. 1. A plurality of sensors 108 of an information handling system 100 may sense characteristics of an environment of the information handling system 100. For example, in a first example environment 102 the information handling system 100 may be at risk of encountering or may encounter shoulder surfing, where an individual other than a user of the information handling system views information displayed on a display of the information handling system 100 without the consent of the user, such as over a shoulder of the user. In a second example environment 104, a user may use the information handling system 100 in a conference room, with a variety of recording devices and individuals present. In a third example environment 106, a user may use the information handling system 100 in a workstation environment, such as in a cubicle or at a desk. In the third example environment, the information handling system 100 may be used in a private context, with a low risk of information being exposed to unauthorized individuals.

Environmental data may be collected from sensors 108 of the information handling system 100 to determine characteristics of an environment in which the information handling system 100 is being used and to select a security profile for application to the information handling system 100. Sensors 108 may, for example, include a Bluetooth antenna 110. The Bluetooth antenna 110 may sense Bluetooth signals from Bluetooth enabled devices within a certain proximity of the information handling system. Such signals may, for example, indicate that one or more individuals, or one or more external information handling systems that may have recording sensors, such as cameras or microphones, are within a predetermined proximity of the information handling system. In some embodiments, environmental data sensed by the Bluetooth antenna 110 may be used to monitor a distance between the information handling system and one or more external information handling systems. The Bluetooth data from the Bluetooth sensor 110 may, for example, include one or more device identifiers for Bluetooth devices in proximity with the information handling system, such as MAC addresses of the Bluetooth devices. The sensors 108 may also include other antennas, such as WiFi antennas or Bluetooth Low Energy (BLE) antennas.

The sensors 108 may also include a camera 112 for collecting video and/or image data. The camera 112 may, for example, be used to determine whether a user is operating in a known secure location, such as an office of a user, or a known unsecure location, such as a public area or a coffee shop. In some embodiments, the camera 112 may be used to capture images of one or more individuals other than a user that are within a field of view of the camera. The information handling system may use image recognition software, such as facial recognition software, to identify one or more individuals in images or video captured by the camera 112.

The sensors 108 may include a microphone 114 for capturing audio data. For example, the microphone 114 may capture sounds generated by individuals, such as footfalls, movement of objects or other sounds. Alternatively or additionally, the microphone 114 may capture voice data of individuals. In some embodiments, the information handling system 100 may identify one or more individuals in proximity to the information handlings system 100 based on voice data captured by the microphone 114.

The sensors 108 may include a temperature sensor 116 for sensing a temperature of an environment around the information handling system. For example, the temperature sensor 116 may sense temperature data which may be used by the security profile management system of the information handling system 100 to determine whether the information handling system is being used indoors or outside.

The sensors 108 may also include a proximity sensor 118. The proximity sensor 118 may sense proximity data, such as a distance between a user and the information handling system or a distance between an individual other than the user and the information handling system. The proximity data generated by the proximity sensor 118 may be used by the security profile management system of the information handling system 100 to determine whether an individual other than the user is in a position where the individual may view private information displayed by a display of the information handling system 100. The sensors 108 may further include other sensors, such as a WiFi antenna, a BLE antenna, an infrared sensor, and other sensors. In some embodiments, multiple sensors, such as cameras, temperature sensors, antennas, and other sensors, may be used to sense electromagnetic field (EMF) noise. Such noise may, for example, indicate presence of hidden listening devices or cameras, or other external information handling systems.

Environmental data from the sensors 108 may be received by a data aggregation module 120 executed by the information handling system 100. The environmental data received from the sensors 108 may be used, for example, as training data to train a machine learning algorithm for security profile generation and application. For example, the data aggregated by the data aggregation module 120 may be provided to a training model 122 for determining a number and configuration of security profiles for the information handling system 100. The model 122 may, for example, be an unsupervised machine learning model. The training model 122 may, for example, configure a plurality of security profiles for the information handling system, determining which security measures should be included in each security profile.

The data aggregated by the data aggregation module 120 and the security profiles generated by the training model 122 may also be provided to a neural net 124 for determining a security profile for application to the information handling system 100 based on received environmental data. For example, data received from the sensors 108 and other data collected by the data aggregation module 120 may be used to train the neural net 124 and/or may be used by the neural net 124 in selecting a security profile for application to the information handling system. Based on an analysis of data collected by the data aggregation module 120 and analyzed by the neural net 124, the security profile application module 126 may apply a security profile recommended by the neural net 124. For example, if a data from the camera indicates an unauthorized individual is near or approaching and Bluetooth data indicates that the unauthorized individual is carrying a recording device, the security profile application module 126 may apply a security profile that includes activating a privacy screen on a display of the information handling system, silencing one or more speakers of the information handling system, and preventing the information handling system from transferring data to unknown external devices. In some embodiments, the security profile application module 126 may also provide the data aggregation module 120 with information specifying the security profile that was applied to aid in training the neural net 124 and the machine learning model 122. In some embodiments, other collected data, such as a user response to application of the security profile may be provided to the data aggregation module 120.

In some embodiments a notification may be provided to a user 128 of one or more environmental conditions determined by the neural net 124 based on the sensor data received from the sensors 108 and other data collected by the data aggregation module 120. For example, the neural net 124 may instruct a user notification module 128 to notify a user that an unrecognized individual or device is detected based on voice, image, wireless signal, and other data. For example, the neural net 124 may determine based on received voice and image data that an unauthorized individual is in close proximity to the information handling system. For example, the neural net 124 may determine that an unauthorized individual is behind the user in a position or close to a position where the unauthorized individual may be able to view sensitive information on a display of the information handling system. The user notification module 128 may notify a user of the environmental conditions determined by the neural net 124. The user notification module 128 may then record a user response to the notification. For example, if a user activates a privacy screen in response to detection of an individual, the user notification module 128 may inform the data aggregation module 120 of the user's response to the notification. The data aggregation module 120 may then provide the recorded response to the model 122 and/or the neural net 124 for training the model 122 and/or the neural net 124. As another example, the neural net 126 may instruct the user notification module 128 to notify the user that an unrecognized device is detected via the Bluetooth antenna 110 or another sensor. For example, Bluetooth antenna 110 may sense a device identifier such as a Bluetooth ID or a MAC address of a device. The neural net 124 may determine that the device is not a known device and may instruct the notification module 128 to notify a user that an unknown device has been detected. If the user recognizes the device, the user may input a response to the notification module 128 associating the device with a known contact, such as a trusted contact. The notification module 128 may provide the user input to a white list module 130. The white list module 130 may, for example, maintain a list of trusted individuals and associated information, such as devices associated with trusted individuals, speech samples and other speech data related to the trusted individuals, image data, such as face scans, associated with the trusted individuals, and other data related to the trusted individuals. The white list module 130 may update a profile for the trusted individual based on the user input received by the user notification module 128. The white list module 130 may also provide white list data to the data aggregation module 120 for use in training the model 122 and/or the neural net 124. The neural net 124 may also use the white list data from the white list module 130 in determining a security profile to apply. For example, if the neural net 124 determines that an individual detected based on the data from sensors 108 is a trusted individual, the neural net 124 may instruct application of a more lenient security profile, such as a security profile with few or no security measures. Thus, a security profile management system of an information handling system 100 may train a neural net for security profile selection using sensed data and user responses and may automatically apply security profiles to an information handling system based on sensed data.

A security profile management system 200 may be executed by one or more processors of an information handling system for automatically determining a security profile to apply to an information handling system based on sensed environmental conditions. The security profile management system 200 may include one or more applications run in the foreground or background of the information handling system.

A training algorithm 202 of the system 200 may assemble training data to be used in training a neural net 212 for selection of information handling system security profiles. The training algorithm 200 may include a sensor data aggregation module 204 for aggregating sensor data from one or more sensors of the information handling system. For example, the sensor data aggregation module 204 may aggregate sensed data from antennas of the information handling system, such as Bluetooth, WiFi, cellular, or other antennas, data from proximity sensors of the information handling system, data from cameras of the information handling system, data from microphones of the information handling system, data from thermal sensors of the information handling system, and data from other information handling system sensors.

In some embodiments, the training algorithm 202 may also include a white list module 238 that may collect and store data about trusted individuals. For example, the white list module 238 may include one or more trusted contact individual profiles including data associated with trusted contact individuals, such as image data of faces of trusted contact individuals, device identifiers associated with the trusted contact individuals, voice data associated with the trusted contact individuals, and other data associated with the trusted contact individuals. In some embodiments, the white list module 238 may provide data regarding the trusted contact individuals to the sensor data aggregation module 204 to determine if any trusted individuals may be detected based on the sensed data. The training algorithm 202 may also receive user responses to prompts regarding sensed data, such as prompts asking a user if a privacy screen should be displayed when an individual is detected.

The sensor data from the sensor data aggregation module 204, the white list data from the white list module 234, and the user input may be used by heat map creation module 206 to create a heat map of predictors. For example, the heatmap creation module 206 may determine which sensed data most likely corresponds to scenarios in which privacy might be at risk, such as presence of unidentified or untrusted individuals, presence of a user in a public environment such as a coffee shop or conference room, presence of a user at the user's workstation or office, whether an unauthorized individual is viewing information on a display of the information handling system from behind the user, and other scenarios. The heat map created by the heat map creation module 206 may, for example, be a matrix of values used to train a neural net executed by neural net module 212. The matrix may, for example, be a two by two matrix including a data source, such as a source sensor, and a value received from the sensor. The heatmap may include an initial set of weights and values to be applied to sensor data, but may update such weights based on user response data and training data.

An unsupervised machine learning model module 208 may receive the heat map from the heat map creation module 206, sensor data from the sensor data aggregation module 204, and other data and may determine a number of security profiles to generate for the information handling system. For example, the unsupervised machine learning model 208 may determine clusters of the heat map, such as certain sets of sensor data or other data, for which security profiles should be generated for the information handling system. For example, a certain security profile may be generated for sensor data that indicates that an information handling system is being used in a public coffee shop, while other security profiles may be generated for sensor data sets that indicate use of the system in a private office or in a conference room. The unsupervised machine learning model module 208 may, for example, determine which security measures should be included in each security profile. For example, the unsupervised learning model may determine security profiles should include one or more of minimizing one or more windows displaying information on a display of an information handling system, activating a privacy screen, muting one or more speakers of the information handling system, blocking connection of external information handling systems, and/or other security measures. The unsupervised machine learning model 208 may update a number and configuration of security profiles for the information handling system periodically or continuously as new information becomes available.

The training algorithm 202 may provide data, such as data regarding the number and configuration of profiles generated by the unsupervised machine learning model module 208, heat map data generated by the heat map creation module 206, sensor data aggregated by the sensor data aggregation module 204, user input data, and white list data from the white list module 238 to a neural net executed by the neural net module 212. A feature extraction module 214 of the neural net module 212 may extract features from sensor data. A convolutional neural net training model module 216 may train the neural net using the extracted features, sensor data, user input data, and other data. The neural net training module 216 may train the neural net to automatically determine which privacy profile should be applied to any given set of sensed sensor data characteristics, white list data, and/or other data. Thus, when sensed data from a plurality of sensors of an information handling system is fed into the neural net 212, the neural net 212 may determine a security profile to apply to the information handling system. The neural net 212 may provide the security profile recommendation to a prediction and application module 220, which may automatically apply the selected security profile to the information handling system. Thus, the neural net 212 may be trained, based on sensor data, white list data, user response data, and other data, to automatically select a security profile for the information handling system based on sensor data.

An information handling system may aggregate sensor data received from sensors at a sensor input module 222. A user response module 224 may receive sensor data from the sensor input module 222 and may prompt a user for a response based on the sensor data. For example, if the sensor data, such as image and proximity data, indicates that a user is in a public environment and that an individual other than the user is standing in a position where the individual could see sensitive information displayed on the display of the information handlings system, the user response module may notify the user of the potential breach of security. In some embodiments, the user response module 224 may prompt the user with a selection of potential responses, such as a plurality of security profiles or actions to maintain privacy that may be implemented. In some embodiments, the user response module 224 may monitor a user response to the notification without providing a selection of potential responses. The user response module 224 may record a user response to the notification. An artificial intelligence agent 226, executed by the information handling system, may collect the user response data and/or sensor data from the user response module 224 and the sensor input module 222 and may provide the sensed data to the neural net 212, such as to a training module 216 of the neural net 212 for training the neural net 212.

The artificial intelligence agent 226 may also monitor and/or manage an electronic sniffing module 230 of the information handling system. The electronic sniffing module 230 may detect electronic devices within range of antennas and other sensors of the information handling system based on sensor data, such as RF signals received by one or more antennas of the information handling system or infrared data indicating presence of cameras or listening devices collected by one or more infrared sensors of the information handling system. When a potential threat to information security is detected by the electronic sniffing module 230, such as an unrecognized device, camera, or a listening device, a threat notification module 234 may notify a user of the information handling system of the potential threat and may record a response of the user to the potential threat. In some embodiments, the threat notification module 234 may provide the user of potential responses. For example, if the user recognizes the detected device, the user may refrain from taking action to protect information from capture by the potential threat. For example, the user may add the detected device to a device white list. If the user does not recognize the detected device, the user may deactivate one or more wireless connection modules of the information handling system, hide sensitive information displayed on one or more displays of the information handling system, and/or deactivate one or more speakers of the information handling system. In some embodiments, the threat notification and response module 234 may provide a user with an array of potential response options or suggested responses to the threat. For example, if a listening device is detected the threat notification and response module 234 may suggest that a user refrain from speaking and/or deactivate one or more speakers of the information handling system. As another example, if an unrecognized cell phone is detected in proximity to the information handling system, the threat notification and response module 234 may ask the user whether the device is recognized and/or trusted. If the user indicates that the device is a trusted device, the threat notification and response module 234 may add the device to a white list 238. In other embodiments, the threat notification and response module 234 may simply notify the user and monitor for a user response without providing potential response options. The threat notification and response module 234 may provide the electronic sniffing data, such as sensed antenna data and infrared data, and user response data to a training algorithm 202. The electronic sniffing data and/or user response data may also be provided to the neural net 212 for use by a training module 216 of the neural net 212 to train the neural net 212.

The AI agent 226 may also control and/or monitor a trusted contact detection module 228. The trusted contact detection module 228 may, for example, monitor for sensor data indicating presence of an individual on the white list 238. For example, the trusted contact detection module 228 may monitor for image, video, audio, and/or wireless signal data that indicates presence of a trusted contact. For example, image or video data that includes images of a face of an individual that match image data stored in a white list 238 and associated with a trusted contact may indicate that the trusted contact individual is present. Likewise, audio data received from audio sensors that matches voice data associated with an individual on the white list 238 may indicate that the individual is present. Wireless signal data received by antennas of the information handling system, such as Bluetooth or WiFi device identifiers, that matches wireless signal data associated with an individual on the white list 238 may indicate that the individual is present. In some embodiments, the trusted contact detection module 228 may monitor for additional devices that may be associated with individuals on the trusted contacts list. For example, the trusted contact detection module 228 may detect, based on image data or wireless device identifier data, that an individual on the white list 238 is present. The trusted contact detection module 228 may also determine, based on sensed antenna data, that an unrecognized wireless device is also present. The trusted contact detection module 228 may monitor the individual and the unrecognized device to determine if the unrecognized device should be associated with the individual on the white list 238. For example, the trusted contact detection module 228 may monitor a position of the individual and a position of the unrecognized device to determine if the unrecognized device moves when the individual moves. If the trusted contact detection module 228 determines that the device is associated with the individual on the white list 238, the trusted contact detection module 228 may update a profile of the trusted contact individual on the white list 238 to include identification information for the unrecognized device, such as a device identifier for the device. Thus, if the device is detected in the future, the neural net 212 may determine that the trusted contact individual is present based on the previously unrecognized device. Thus, a white list may be automatically updated based on devices or other information determined to be associated with a trusted contact individual.

Figure 3:
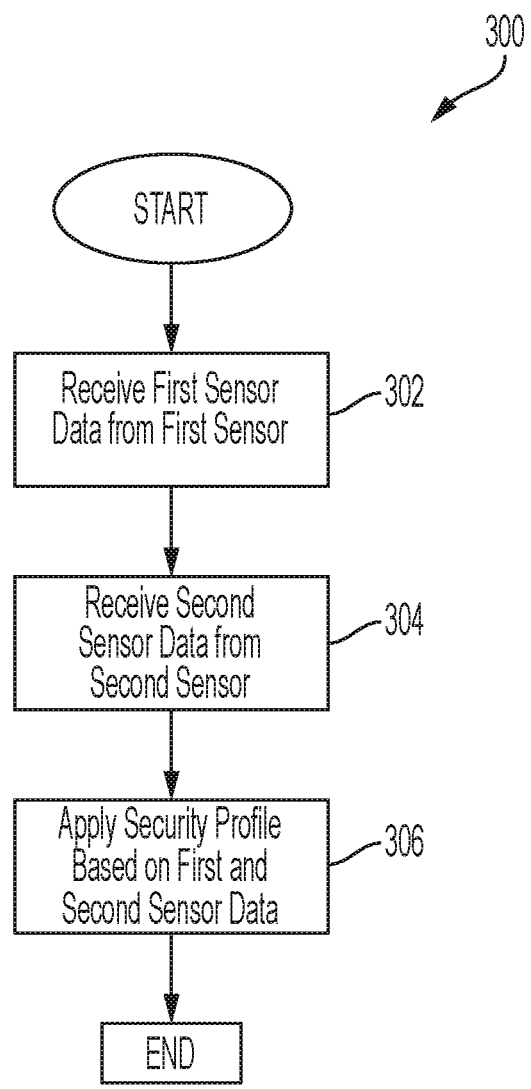
FIG. 3 is a block diagram of an example method for automatically applying a security profile based on sensor data according to some embodiments of the disclosure.

An information handling system may execute a machine learning algorithm including a neural net to automatically select a security profile for application to an information handling system based on sensor data. An example method 300 for automatic application of a security profile to an information handling system is shown in FIG. 3. The method 300 may begin, at step 302, with receipt of first sensor data from a first sensor. The method 300 may also include, at step 304, receipt of second sensor data from a second sensor. The first and second sensors may, for example, include video sensors and image sensors, such as cameras, microphones, antennas, such as WiFi, Bluetooth, and/or near field communication antennas, infrared sensors, proximity sensors, temperature sensors, global positioning sensors, and other sensors. As one example, the first sensor data from the first sensor may include video data from a camera of the information handling system while the second sensor data may include wireless data, such as wireless device identification data, from an antenna of the information handling system. The received sensor data may, for example, be data with received signal strength indication (RSSI) values. Thus, the received sensor data may describe additional details about the environment, such as a distance of a detected external information handling system from the information handling system, instead of simply indicating the presence of the external information handling system.

At step 306, the information handling system may, based on the first sensor data and the second sensor data, automatically apply a security profile to the information handling system. For example, the first sensor data and the second sensor data may be received by a neural net for security profile selection. The neural net may determine a security profile to be applied to the information handling system and may apply the security profile to the information handling system automatically. For example, the neural net may determine that based on the first sensor data and the second sensor data the information handling system is at risk of exposing private information to unrecognized or unauthorized individuals, such as in a shoulder surfing scenario, and may apply a security profile to the information handling system based on the risk. If the information handling system determines that an individual is shoulder surfing, based on sensor data, the information handling system may proceed to determine if the individual is a trusted contact. If the detected individual is not determined to be associated with a trusted contact individual profile in a white list of the information handling system, the information handling system may activate a security profile that includes alerting the user and/or turning on a privacy screen. As another example, the information handling system may determine based on the received first and/or second sensor data, that a hidden camera or microphone is present. For example, the information handling system may detect a hidden microphone via a Bluetooth sniffing process using a Bluetooth antenna or may detect a hidden camera via infrared data from an infrared sensor. Based on the detected presence of the hidden microphone or camera, the information handling system may implement a security profile that includes alerting the user, removing sensitive information from a display of the information handling system, and/or muting a speaker of the information handling system. As another example, the information handling system may determine that an individual is walking towards the information handling system based on a sensed position of an external information handling system, such as a cell phone or laptop. The information handling system may detect the external information handling system via a wireless antenna and may determine that an individual carrying the external information handling system is moving towards the information handling system by monitoring a position of the external information handling system, such as through a signal strength of the external information handling system. The information handling system may determine whether the external information handling system is associated with a known individual. For example, the information handling system may compare an identifier of the external information handling system received by an antenna of the information handling system with one or more known device identifiers stored in a white list of the information handling system. If the identifier corresponds to an identifier stored in the white list of the information handling system, the information handling system may take no action, or may simply notify a user. If the identifier does not correspond to an identifier stored in the white list, the information handling system may implement a security profile including alerting the user and/or hiding sensitive information displayed on the display of the information handling system.

A security profile may include one or more of activating a privacy screen, minimizing one or more windows displayed on the display of the information handling system, muting a speaker of the information handling system, or blocking connection of the information handling system associated with the first sensor data. For example, if the information handling system detects an unrecognized Bluetooth device, a security profile may be selected and applied that prevents connection to unrecognized Bluetooth devices and/or deactivates a Bluetooth connection module of the information handling system. Activating a privacy screen may include adjusting a display output of the information handling system to obscure private information displayed on the display of the information handling system from individuals other than the user. In some embodiments, a security profile may prevent a user from entering a password when a potential security breach is detected based on the sensed sensor data. Thus, an information handling system may automatically apply a security profile to the information handling system based on sensor data from a plurality of sensors.

Figure 4:
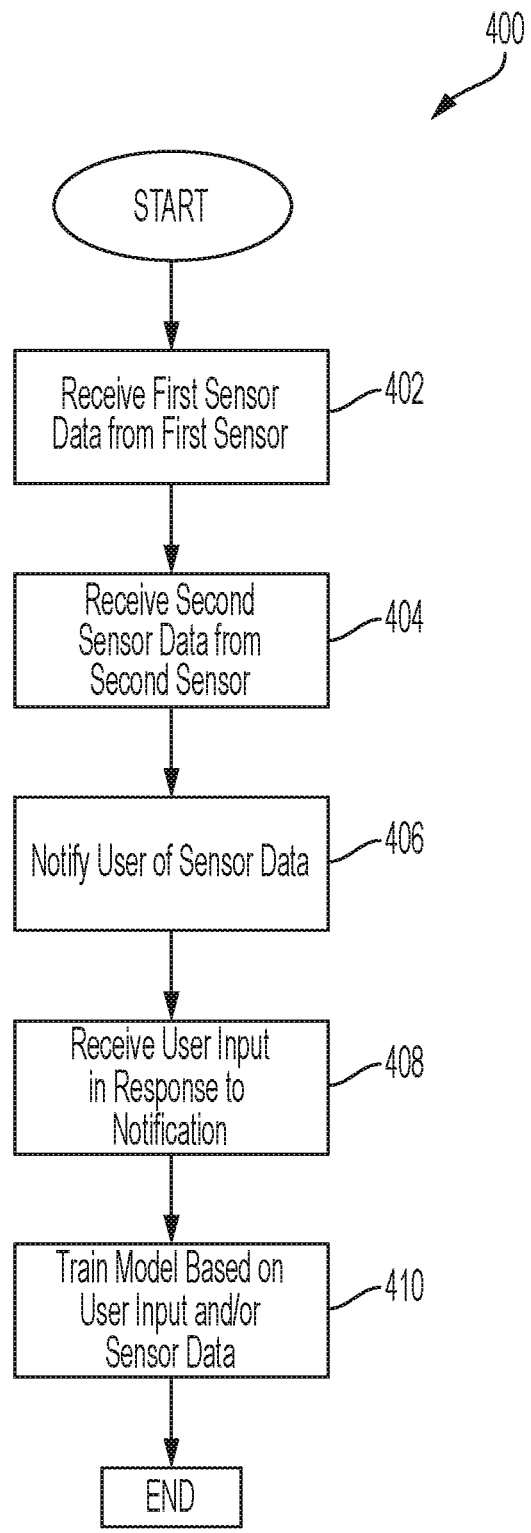
FIG. 4 a block diagram of an example method for training a machine learning algorithm for security profile application according to some embodiments of the disclosure.

An information handling system may use received sensed environmental data and user responses to received sensed environmental data to train a machine learning model including a neural net for selection of information handling system security profiles. An example method 400 for training a machine learning model for selection of information handling system security profiles is shown in FIG. 4. The method 400 may begin, at step 402, with receipt of first sensor data from a first sensor. At step 404, second sensor data may be received from a second sensor. The first sensor data and the second sensor data may be received from first and second sensors similarly to the receipt of the first and second sensor data described with respect to steps 302 and 304 of the method 300 discussed above.

At step 406, a user may be notified of the received sensor data. For example, the information handling system may display a pop up for the user notifying the user of the sensor data. If sensor data indicating that an unknown individual is present and in position to view information displayed on a display of the information handling system, the information handling system may notify a user of the presence of the unknown individual. In some embodiments, the information handling system may present the user with a selection of potential responses to the sensor data. For example, the information handling system may ask the user if the user wishes to hide sensitive information displayed on the information handling system, mute a speaker of the information handling system, or add the unknown individual to a white list of the information handling system.

At step 408, the information handling system may receive user input in response to the notification. For example, a user may select one of a plurality of potential responses to the received sensor data suggested by the information handling system. In some embodiments, the information handling system may monitor actions taken by a user in addition to or in place of providing a user with a list of potential responses. For example, the information handling system may detect that a user has minimized a window in response to the notification with or without providing the user with a list of potential response options.

At step 410, the information handling system may train a model based on the user response input and/or the received first and second sensor data. Training the machine learning model may, for example, include at least one of training a machine learning model, such as an unsupervised machine learning model, for generation of information handling system security profiles or training a neural net for selection of a profile for application to an information handling system. For example, the information handling system may use the user input and received sensor data to train a machine learning model for generation of a plurality of security profiles. The information handling system may generate a plurality of security profiles for the information handling system using the received first and second sensor data using an unsupervised machine learning model as discussed herein, such as through generation of a heatmap of sensed data characteristics. Generation of the plurality of security profiles may include determining a number of security profiles to generate based on the first sensor data and the second sensor data. The information handling system may, alternatively or additionally, use the received sensor data and/or user input to train a neural network for security profile selection. For example, in some embodiments, the information handling system may train a neural net at step 410 without receipt of user input, such as using sensor data without user input received in response to the sensor data, while in other embodiments the information handling system may use both received sensor data and received user response data. In some embodiments, the information handling system may train the machine learning model and/or neural net based on received first and second sensor data without notifying the user of receipt of the first and second sensor data and/or receiving user input in response to the first and second sensor data. Thus, a model of an information handling system including an machine learning model for security profile generation, such as an unsupervised machine learning model, and/or a neural net for automatic security profile selection and application may be trained using sensor data and/or user response data received in response to the sensor data.

An information handling system may maintain a white list of trusted contact individuals to enhance a user experience. For example, if the information handling system detects presence of an individual, but determines that the individual is a trusted contact based on a white list, the information handling system may refrain from automatically applying a security profile, or may apply a less invasive security profile, based on the presence of the trusted contact. The white list may, for example, include multiple trusted contact individual profiles. Each trusted contact individual profile may include data associated with the trusted contact individual, such as image data of a trusted contact individual's face, voice data associated with the trusted contact individual, device identification information for external information handling systems associated with the trusted contact individual, such as MAC addresses or other identifiers for laptops, cell phones, and other external information handling systems associated with the trusted contact individual, and other information associated with the trusted contact individual. The information handling system may maintain and update the white list automatically using sensed environmental data.

Figure 5:
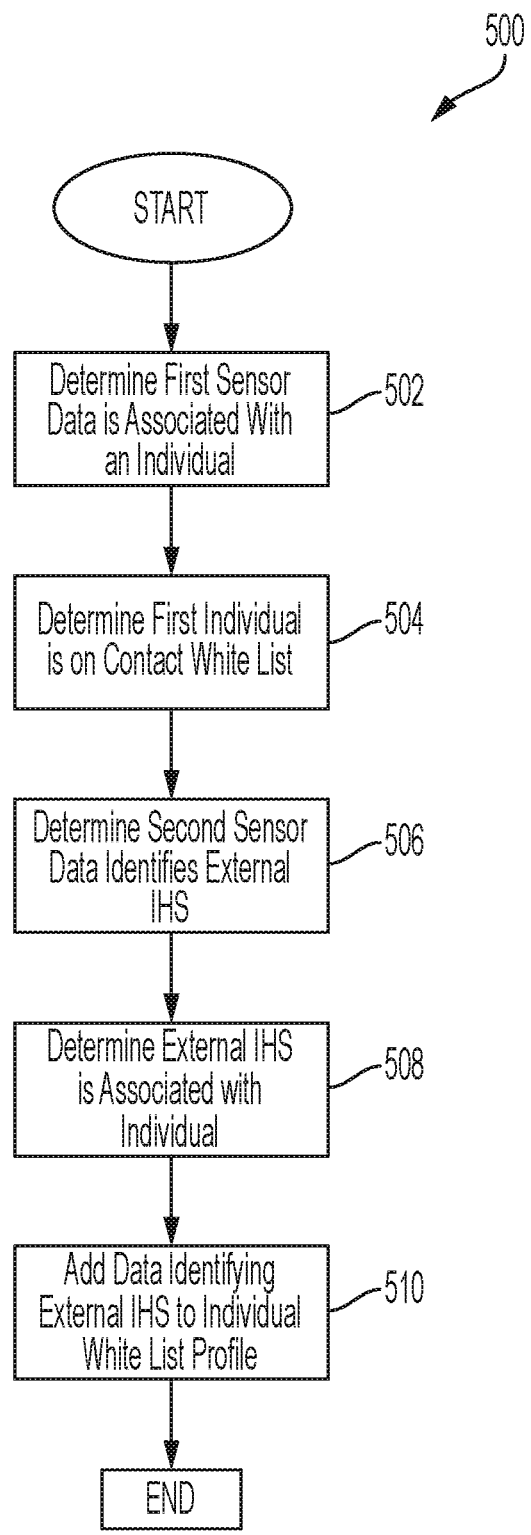
FIG. 5 is a block diagram of an example method for automatically updating a contact white list of a security profile selection system based on sensor data according to some embodiments of the disclosure.

An example method 500 for updating a white list based on sensed environmental data is shown in FIG. 5. The method 500 may begin, at step 502, with determining that the first sensor data is associated with a first individual. The first sensor data may, for example, be the first sensor data described with respect to step 402 of the method 400 of FIG. 4 or the first sensor data described with respect to step 302 of the method 300 of FIG. 3. For example, the method shown in FIG. 5 may be performed subsequent to or contemporaneously with the methods of FIGS. 3-4. The first data may, for example, be image data of a face of the first individual, wireless signal data including an identifier for an external information handling system associated with the first individual, audio data including a voice of a first individual, or other data associated with the first individual.

At step 504, the information handling system may determine that the first individual is on a contact white list. For example, the information handling system may compare the first sensor data with data stored in a white list associated with one or more trusted contact individual profiles, such as image data of faces of trusted contact individuals, voices samples of trusted contact individuals, or identifiers of one or more external information handling systems associated with the trusted contact individuals. The information handling system may determine that the sensor data matches data stored in a white list profile of a trusted contact individual.

At step 506, the information handling system may determine that the second sensor data comprises data identifying an external information handling system. The second sensor data may, for example, be the second sensor data described with respect to step 404 of the method 400 of FIG. 4 or the second sensor data described with respect to step 304 of the method 300 of FIG. 3. The second sensor data may, for example, be RF data received by an antenna of the information handling system including data identifying an external information handling system, such as a MAC address or other hardware identifier of the external information handling system. The external information handling system may, for example, be an unknown or unrecognized information handling system. For example, identification data corresponding to the second sensor data identifying the external information handling system may not be found in a white list of the information handling system.

At step 508, the information handling system may determine that the external information handling system is associated with the individual. For example, the information handling system may monitor a location of the individual, for example, based on image data of the individual, proximity data of the individual, or location data of an additional external information handling system of the individual. The information handling system may also monitor a location of the external information handling system. If the information handling system determines that a location of the external information handling system changes when a location of the individual changes, based on sensed environmental data, the information handling system may determine that the external information handling system is associated with the individual. As another example, the information handling system may monitor for the external information handling system and individual over time. If the external information handling system and the individual are detected within the same time period a predetermined number of times, such as ten times, the information handling system may determine that the external information handling system is associated with the individual.

At step 510, the information handling system may add data identifying the external information handling system to a profile of the individual on a trusted contact white list of the information handling system. For example, the information handling system may add a media access control (MAC) address or other identifier of the external information handling system to the profile of the trusted contact individual on the white list of the information handling system. Thus, if the external information handling system is subsequently detected, the information handling system may determine that the individual with which the external information handling system is associated is present.

The flow chart diagrams of FIGS. 3-5 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received sensor data, and a system or environmental characteristic and/or a degree to which such an influencing attribute affects the outcome of such a system or environmental characteristic.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for managing information handling system security, comprising:
   receiving from a first sensor of an information handling system first sensor data;
   receiving from a second sensor of the information handling system second sensor data;
   identifying, based, at least in part, on the first sensor data, an individual, other than a user of the information handling system, associated with the first sensor data;
   determining from a security white list of the information handling system if a second information handling system is associated with the identified individual by:
      determining that the identified individual is on the security white list of the information handling system;
      determining that the second sensor data comprises data identifying a second external information handling system that is not present on the security white list of the information handling system;
      determining that the second external information handling system is associate with the identified individual;
      adding data identifying the second external information handling system to a profile of the identified individual on the security white list;
   generating a plurality of security profiles for the information handling system based, at least in part, on the received first sensor data, the second sensor data, and the security white list; and
   applying a security profile of the generated plurality of security profiles to the information handling system based, at least in part, on the first sensor data, the second sensor data, and the security white list.

2. The method of claim 1, wherein the first sensor comprises an antenna and the second sensor comprises a camera, and wherein applying the security profile to the information handling system based, at least in part, on the first sensor data and the second sensor data comprises activating a privacy screen of the information handling system based, at least in part, on detection of an unknown individual based on the first sensor data and the second sensor data.

3. The method of claim 1,
wherein applying the security profile comprises applying the security profile based, at least in part, on the identified individual.

4. The method of claim 3, wherein the first sensor data comprises data identifying a first external information handling system associated with the identified individual.

5. The method of claim 1, wherein generating a plurality of security profiles comprises determining a number of security profiles for generation based, at least in part, on the first sensor data and the second sensor data.

6. The method of claim 1, further comprising:
receiving a response input from a user based, at least in part, on the received first sensor data and the received second sensor data; and
training a machine learning model for generation of security profiles of the information handling system based, at least in part, on the received first sensor data, the received second sensor data, and the received response input.

7. An information handling system, comprising:
a processor;
a memory;
a first sensor; and
a second sensor
wherein the processor is configured to perform steps comprising:
receiving from the first sensor first sensor data;
receiving from the second sensor second sensor data;
identifying, based, at least in part, on the first sensor data, an individual, other than a user of the information handling system, associated with the first sensor data;
determining from a security white list of the information handling system if a second information handling system is associated with the identified individual by:
determining that the identified individual is on the security white list of the information handling system;
determining that the second sensor data comprises data identifying a second external information handling system that is not present on the security white list of the information handling system;
determining that the second external information handling system is associate with the identified individual;
adding data identifying the second external information handling system to a profile of the identified individual on the security white list;
generating a plurality of security profiles for the information handling system based, at least in part, on the received first sensor data, second sensor data, the security white list; and applying a security profile to the information handling system based, at least in part, on the first sensor data, the second sensor data, and the security white list.

8. The information handling system of claim 7, wherein the first sensor comprises an antenna and the second sensor comprises a camera, and wherein applying the security profile to the information handling system based, at least in part, on the first sensor data and the second sensor data comprises activating a privacy screen of the information handling system based, at least in part, on detection of an unknown individual based on the first sensor data and the second sensor data.

9. The information handling system of claim 7, wherein the processor is further configured to
apply the security profile based, at least in part, on the identified individual.

10. The information handling system of claim 9, wherein the first sensor data comprises data identifying a first external information handling system associated with the identified individual.

11. The information handling system of claim 7, wherein generating a plurality of security profiles comprises determining a number of security profiles for generation based, at least in part, on the first sensor data and the second sensor data.

12. The information handling system of claim 7, wherein the processor is further configured to perform steps comprising:
receiving a response input from a user based, at least in part, on the received first sensor data and the received second sensor data; and
training a machine learning model for generation and selection of security profiles of the information handling system based, at least in part, on the received first sensor data, the received second sensor data, and the received response input.

13. A computer program product comprising:
a non-transitory computer readable medium comprising instructions for causing an information handling system to perform steps comprising:
receiving from a first sensor first sensor data;
receiving from a second sensor second sensor data;
identifying, based, at least in part, on the first sensor data, an individual, other than a user of the information handling system, associated with the first sensor data;
determining from a security white list of the information handling system if a second information handling system is associated with the identified individual by:
determining that the identified individual is on the security white list of the information handling system;
determining that the second sensor data comprises data identifying a second external information handling system that is not present on the security white list of the information handling system;
determining that the second external information handling system is associate with the identified individual;
adding data identifying the second external information handling system to a profile of the identified individual on the security white list;
generating a plurality of security profiles for the information handling system based, at least in part, on the received first sensor data, second sensor data, and the security white list; and applying a security profile to the information handling system based, at least in part, on the first sensor data, the second sensor data, and the security white list.

14. The computer program product of claim 13, wherein the non-transitory computer readable medium further comprises applying the security profile based, at least in part, on the identified individual.

15. The computer program product of claim 14, wherein the first sensor data comprises data identifying a first external information handling system associated with the identified individual.

16. The computer program product of claim 13, wherein generating a plurality of security profiles comprises determining a number of security profiles for generation based, at least in part, on the first sensor data and the second sensor data.

17. The computer program product of claim 13, wherein the non-transitory computer readable medium further comprises instructions for causing the information handling system to perform steps comprising:
    receiving a response input from a user based, at least in part, on the received first sensor data and the received second sensor data; and
    training a machine learning model for generation and selection of security profiles of the information handling system based, at least in part, on the received first sensor data, the received second sensor data, and the received response input.

* * * * *